United States Patent
Riley et al.

(10) Patent No.: US 8,706,323 B2
(45) Date of Patent: Apr. 22, 2014

(54) AIRCRAFT DISPATCH INFORMATION

(75) Inventors: Victor Andrew Riley, Point Roberts, WA (US); Robert G. Borst, Renton, WA (US); Armando Gonzalez, Issaquah, WA (US); David Scott Kinney, Everett, WA (US)

(73) Assignee: The Boeing Company, Chicago, IL (US)

( * ) Notice: Subject to any disclaimer, the term of this patent is extended or adjusted under 35 U.S.C. 154(b) by 850 days.

(21) Appl. No.: 12/466,570

(22) Filed: May 15, 2009

(65) Prior Publication Data

US 2010/0292869 A1    Nov. 18, 2010

(51) Int. Cl.
| | |
|---|---|
| G06Q 10/00 | (2012.01) |
| G06F 17/00 | (2006.01) |
| G06F 19/00 | (2011.01) |
| G01M 17/00 | (2006.01) |
| G08G 5/00 | (2006.01) |

(52) U.S. Cl.
USPC .......... 701/14; 701/29.1; 701/29.4; 701/31.4; 701/33.4; 705/7.12; 705/7.22

(58) Field of Classification Search
USPC ............. 701/1, 3, 8, 9, 14, 29, 30, 32, 33, 35, 701/36, 29.1, 29.2, 29.3, 29.4, 29.6, 29.7, 701/29.9, 30.1, 30.2, 30.3, 31.3, 31.4, 31.5, 701/31.6, 32.1, 32.7, 33.4, 33.5, 33.6, 34.4, 701/400; 244/75.1; 340/945, 963, 971; 705/7.11, 7.12, 7.22
See application file for complete search history.

(56) References Cited

U.S. PATENT DOCUMENTS

| | | | |
|---|---|---|---|
| 4,943,919 | A | 7/1990 | Aslin et al. |
| 6,115,656 | A | 9/2000 | Sudolsky |
| 6,574,537 | B2 | 6/2003 | Kipersztok et al. |
| 6,618,654 | B1 | 9/2003 | Zaat |
| 6,691,007 | B2 | 2/2004 | Haugse et al. |
| 7,065,433 | B2 | 6/2006 | Basu et al. |
| 2003/0033178 | A1 | 2/2003 | Black et al. |
| 2003/0109973 | A1* | 6/2003 | Hensey et al. ................... 701/35 |
| 2008/0147264 | A1* | 6/2008 | Doulatshahi et al. ........... 701/30 |
| 2009/0265056 | A1* | 10/2009 | Yukawa et al. ................. 701/29 |

OTHER PUBLICATIONS

International Search Report and Written Opinion of the International Searching Authority; International Application No. PCT/US2010/031091; Jun. 11, 2012.
Airplane Health Management—Operational Performance—Lifecycle Solutions, Boeing Commercial Airplanes, www.boeing.com (6 pgs), Mar. 2008.

(Continued)

*Primary Examiner* — Thomas Tarcza
*Assistant Examiner* — Edward Pipala
(74) *Attorney, Agent, or Firm* — Toler Law Group, PC

(57) ABSTRACT

Systems and methods to manage aircraft dispatch information are provided. A particular method includes receiving fault information at a dispatch information computing system. The fault information is associated with an aircraft. The method also includes accessing operational restriction information associated with the aircraft based on the fault information. The method further includes automatically determining a set of bottom line operational limitations of the aircraft based on the fault information and the operational restriction information. The method also includes generating customized checklists for the various users of the information. The method also includes sending output data from the dispatch information computing system to an output device. The output data identifies the set of bottom line operational limitations of the aircraft and tasks to be completed by the various users.

20 Claims, 2 Drawing Sheets

(56) References Cited

OTHER PUBLICATIONS

Managing Information to Improve Operational Decision Making—Maintenance Services—Airplane Health Management, Boeing Commercial Airplanes (1 pg), Apr. 27, 2009.

Electronic Flight Bag—Operational Performance—Lifecycle Solutions, Boeing Commercial Airplanes, www.boeing.com (6 pgs), Apr. 2008.

* cited by examiner

AIRCRAFT DISPATCH INFORMATION

FIELD OF THE DISCLOSURE

The present disclosure is generally related to aircraft dispatch information systems and methods.

BACKGROUND

Dispatching a flight requires sorting through large amounts of information to determine restrictions on operation of aircraft, and providing information to various groups responsible for different aspects of preparing the aircraft for flight. Typically, this is done by flight dispatchers and maintenance personnel, although others, including load planners and ramp personnel, may also be involved. In addition, the flight crew typically verifies that all necessary steps have been completed. Herein, the term "dispatcher" refers to all personnel involved in the dispatch process. As part of that process, a dispatcher may analyze the condition of an aircraft with respect to a plurality of minimum equipment lists (MELs). Occasionally, a dispatcher may miss an MEL item due to the complexity of the information involved, due to excessive workload, or for other reasons. Additionally, certain MEL items may be interdependent with other MEL items or other performance or operational requirements. Thus, MEL items may be missed due to the complex interactions between the MELs and the other performance and operational requirements. When a dispatcher makes a mistake (e.g., misses an MEL or a condition of the MEL), additional costs may arise and passengers may be delayed. For example, a flight may have to divert or turn back to properly address the missed MEL item. Additionally, regulatory sanctions may be imposed.

SUMMARY

In a particular embodiment, a system includes a processor and an input interface coupled to the processor. The input interface receives fault information associated with an aircraft. The system also includes memory accessible to the processor. The memory includes operational restriction information associated with the aircraft and checklist generator instructions. The checklist generator instructions are executable by the processor to generate one or more customized task lists. Each of the customized task lists includes tasks assigned to a particular operational group based on the received fault information and the operational restriction information. The system further includes an output interface coupled to the processor. The output interface sends a first task list of the one or more customized task lists to a first interface associated with a first operational group and sends a second task list of the one or more customized task lists to a second interface associated with a second operational group.

In another particular embodiment, a method includes receiving fault information at a dispatch information computing system. The fault information is associated with an aircraft. The method also includes accessing operational restriction information associated with the aircraft based on the fault information. The method further includes automatically determining a set of bottom line operational limitations of the aircraft based on the fault information and the operational restriction information. The method also includes sending output data from the dispatch information computing system to an output device. The output data identifies the set of bottom line operational limitations of the aircraft.

In yet another particular embodiment, a computer readable storage medium includes operational instructions that, when executed by a processor, cause the processor to access operational restriction information associated with an aircraft in response to receiving fault information associated with the aircraft. The computer readable storage medium also includes operational instructions that, when executed by the processor, cause the processor to determine a set of bottom line operational limitations of the aircraft based on the fault information and the operational restriction information. The computer readable storage medium further includes operational instructions that, when executed by the processor, cause the processor to send output data to an output device. The output data identifies the set of bottom line operational limitations of the aircraft.

DETAILED DESCRIPTION

Figure 1:
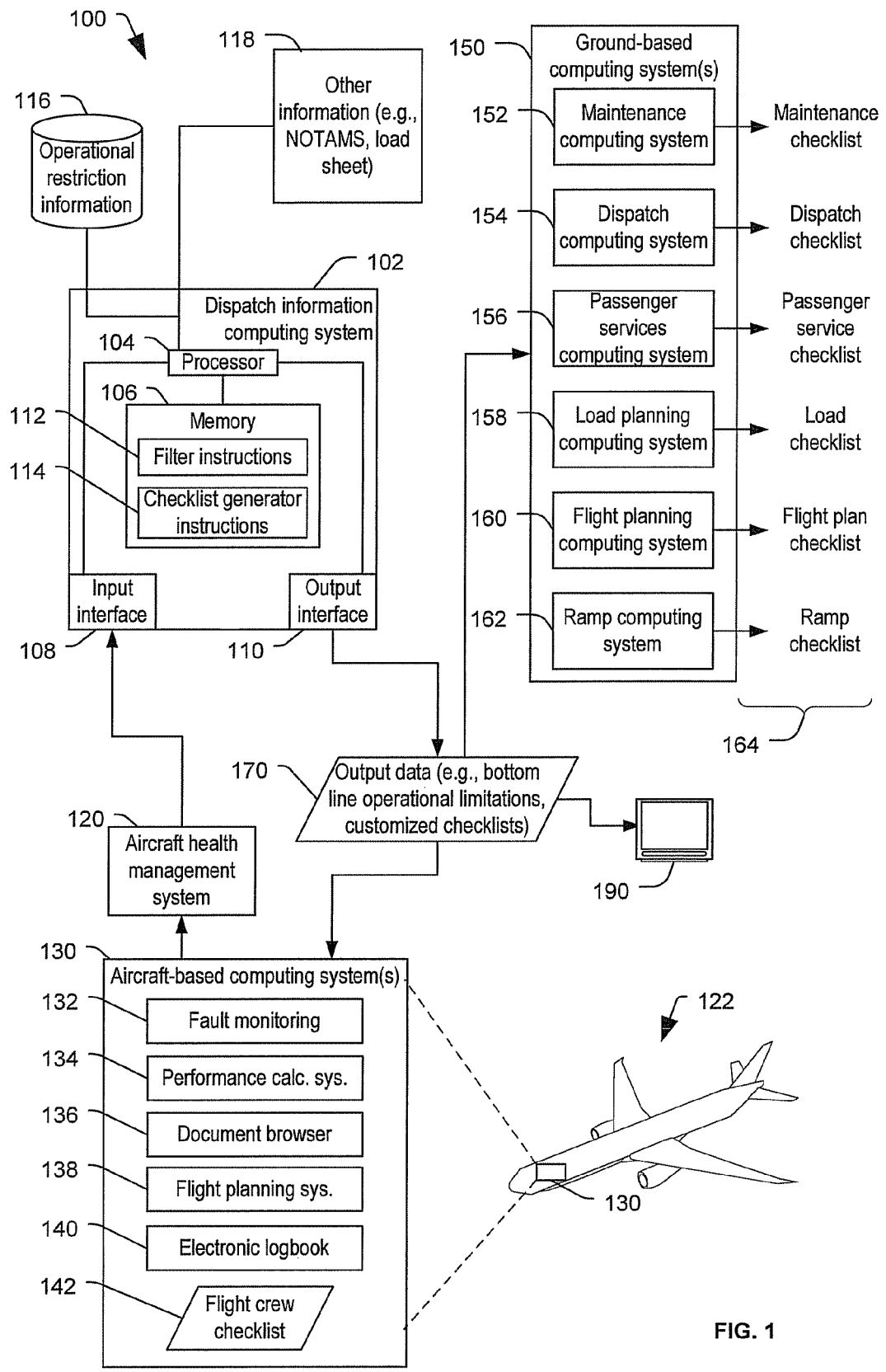
FIG. 1 is a block diagram of a particular embodiment of an aircraft dispatch information system.

In a particular embodiment, a dispatch information computing system is utilized to automatically analyze dispatch limitations, fault status, and other data associated with an aircraft. The dispatch information computing system may produce customized reports for dispatchers, maintenance personnel, flight crew, and other users of dispatch status information. The dispatch information computing system may also generate custom lists of actions to be performed before the aircraft can be dispatched and a set of operating limitations of the aircraft due to maintenance deferrals. The dispatch information computing system may update the dispatch status information as changes occur to provide real-time or near real-time information to groups responsible for various aspects of dispatching the aircraft. For example, the dispatch information computing system may generate lists of actions and checks to be performed and may update the dispatch status information as information is received indicating that actions or checks have been performed. The list of actions and checks may include tasks to be performed by maintenance personnel, flight dispatchers, load planning, ramp crew, passenger services, and flight crew to ensure that flights are dispatched properly given the operational limitations (e.g., maintenance deferrals) of the particular aircraft.

The dispatch information computing system may receive information from other systems or disseminate information relevant to particular users to output devices accessible to such users. For example, aircraft fault information may be received from an aircraft health management system, and the operational limitation information and checklists may be sent to a display device or sent to a computing system associated with the particular users (such as an electronic flight bag, an electronic checklist, etc.). The dispatch information computing system may also reconcile dispatch and operating limitations with flight plans and performance calculations.

The complexity of properly dispatching flights using the dispatch information computing system may be reduced as compared to dispatch systems that use paper-based minimum equipment lists (MELs) or electronic databases of MELs. For example, the reduced complexity is demonstrated in that only information relevant to a particular flight may be presented to a user rather than an entire set of MELs (many of which may not be relevant and others of which may have complex interdependencies). Furthermore, even within a particular MEL item, some information may be relevant to the flight and other information not, and some information may be intended for a particular user and other information not. Users of existing paper or electronic MELs typically manually determine what information is intended for them, which of that information is relevant to the particular flight being dispatched, and what bottom-line limitations exist for dispatching that flight based on the particular combination of MELs active for that flight. In contrast, embodiments disclosed herein present a bottom line set of operation limitations to a dispatcher rather than requiring the dispatcher to review and evaluate potentially complex interdependencies between multiple MEL items to determine whether any combination of MELs imposes a more restrictive limitation than each of the individual MEL items does on its own. In addition, embodiments disclosed herein generate lists of tasks customized to particular user groups rather than presenting a large set of information to all user groups. Additionally, there may be a reduced burden on each user group to pass on relevant information to other user groups since the dispatch information computing system provides for real-time or near-real time updates. The bottom line operation limitations and other relevant information may be provided for use in flight planning, load planning, performance calculations, and so forth.

In a particular embodiment, the dispatch information computing system examines all active MEL items related to an aircraft and determines whether the aircraft can be dispatched. Additionally, the dispatch information computing system may determine the bottom line operating limitations (e.g., extended-range twin-engine operational performance standards (ETOPS) limits, altitude limits, etc.) that apply to the particular aircraft based on the MEL items. The dispatch information computing system may also automatically determine how many days or flights the aircraft can make before maintenance is required. Additionally, the dispatch information computing system may generate checklists of actions and checks for various operational groups, such as maintenance personnel, dispatchers, load planning, ramp crew, passenger services, and flight crew.

To perform the various functions described, the dispatch information computing system may receive information from an aircraft health management system, an electronic log book, an engine indicating and crew alert system (EICAS), other information sources, or any combination thereof. The dispatch information computing system may also receive and analyze weather information, Notices to Airmen (NOTAMS), and other relevant information to inform dispatch decisions and to adjust flight planning calculations. For example, when operation of a particular aircraft in icing conditions is restricted due to a maintenance condition and a weather forecast for a flight of the aircraft predicts icing conditions en route, the dispatch information computing system may generate a flag or warning indicating that the icing condition restriction applies to the aircraft. The dispatch information computing system may send information, such as operational limitations, to onboard performance tools of the aircraft that use the information to automate performance calculation adjustments used for active maintenance deferrals. Additionally, the dispatch information computing system may account for interdependent operational restrictions (e.g., MELs, ETOPS, etc.), weather, winds, fuel, what kinds of cargo can be carried, weight distribution, and other information that can affect load planning, passenger services, and ramp personnel to generate customized task lists and to identify bottom line operational limitations.

In a particular embodiment, the dispatch information computing system may also provide an item-by-item audit trail for a flight. Thus, the dispatch information computing system may reduce the likelihood that users will overlook important dispatch requirements or forget to pass on information that is important to other parties. The dispatch information computing system may also reduce workload and improve the efficiency and effectiveness of maintenance personnel and dispatchers.

Referring to FIG. 1, a block diagram of a particular embodiment of an aircraft dispatch information system is shown and is designated generally 100. The system 100 includes a dispatch information computing system 102. The dispatch information computing system 102 receives information from a plurality sources to determine bottom line operational limitations of one or more aircraft and to assign tasks to be performed to various operational groups. For example, the dispatch information computing system 102 may receive fault information associated with an aircraft 122 via an input interface 108. The fault information may be received directly from the aircraft 122 by communication with an aircraft-based computing system 130, from an aircraft health management system 120 that communicates with a plurality of aircraft, from personnel associated with the aircraft 122, (e.g., flight crew personnel, maintenance personnel, etc.), or any combination thereof. The fault information may identify an actual or potential fault associated with the aircraft 122. For example, the fault information may be derived from a fault monitoring system 132 on-board the aircraft 122 that detects or records faults in various aircraft systems. In another example, the fault information may be reported by a flight crew or maintenance crew member that logs an entry in an electronic logbook 140 associated with the aircraft 122.

The dispatch information computing system 102 may include a processor 104 coupled to the input interface 108. The processor 104 may execute instructions stored in a memory 106 accessible to the processor 104. In a particular embodiment, the instructions include filter instructions 112. The filter instructions 112 may be executable by the processor 104 to cause the processor 104 to analyze operational restriction information 116 based on the fault information to automatically determine bottom line operational limitations applicable to the aircraft 122. In a particular embodiment, the instructions include checklist generator instructions 114. The checklist generator instructions 114 may be executable by the processor 104 to generate one or more customized task lists such as maintenance task lists, load planning tasks lists, ramp personnel tasks lists 164, flight crew task lists 142, or any combination of these. Each of the customized task lists 142, 164 may include tasks assigned to a particular operational group (e.g., a maintenance group, an aircraft dispatch group, a passenger services group, a load planning group, a flight planning group, a ramp group, a flight crew group, etc.). The customized task lists 142, 164 may be generated based on the fault information and the operational restriction information 116.

In a particular embodiment, the operation restriction information 116 includes one or more minimum equipment lists (MELs) associated with the aircraft 122. The MELs may specify conditions for airworthy operation of the aircraft 122. Additionally, the MELs may include procedures that are to be followed in various conditions. For example, the MELs may include flight crew procedures, maintenance procedures, loading procedures, or any combination thereof. The MELs may be generated by aircraft operators, aircraft manufacturers, or both, and may be approved by regulatory agencies, such as the U.S. Federal Aviation Administration or similar agencies of other governments. Generally, the MELs may provide for operation of the aircraft 122 despite certain fault conditions being present in the aircraft 122, such as particular instruments or systems being inoperative. Thus, the MELs may specify operation restrictions that allow the aircraft 122 to operate safely. To illustrate, an MEL may specify that based on a particular fault being present in the aircraft 122, the aircraft 122 may not operate in certain weather conditions, such as where icing may be present. The MELs may also specify certain procedures to be followed to ensure safe operation of the aircraft 122. For example, when a particular fault condition is present, an MEL may specify that landing gear remain down for a particular time after take-off or that an auxiliary power unit operate during take-off or landing.

The MELs may be inter-related. That is, a condition of one MEL may depend on another MEL. For example, a first MEL may include a first operational limitation and a second MEL may apply when the first operation limitation is applicable to the aircraft 122. The MELs may include various types of operational limitations that may be grouped into categories of operation restrictions, such as equipment that should be functional or operated; capacity, time or distance limitations; weather related limitations (e.g., icing, wind shear or visibility limits, etc.) or other categories of limitations. More than one MEL may include limitations related to a particular category of operational restrictions. When two or more MELs each include operational restrictions associated with a particular category of operational restrictions, the dispatch information computing system 102 may execute the filter instructions 112 to determine a set of bottom line operation restrictions. The bottom line operational restrictions may include the more restrictive limitations of a set of operational restrictions in each category of operational restrictions. For example, a first MEL that is applicable to the aircraft 122 (e.g. based on the presence of a first fault condition) may indicate that the aircraft 122 should not be operated at an altitude higher than 20,000 feet. Additionally, a second MEL that is applicable to the aircraft (e.g., based on the presence of the first fault condition, a second fault condition, or both) may indicate that the aircraft 122 should not be operated at an altitude higher than 10,000 feet. In this example, the 10,000 foot restriction is more restrictive than the 20,000 foot limitation; thus, the 10,000 foot limitation may be included in a set of bottom line operational restrictions associated with the aircraft unless an even more restrictive limitation is also associated with the aircraft. The 20,000 foot limitation is not included in the bottom line operational limitations.

In a particular embodiment, the operational restriction information 116 includes one or more performance standards, such as extended-range twin-engine operational performance standards (ETOPS) or similar performance standards (e.g., long range operational performance standards (LROPS)). The performance standards may specify operational restrictions related to operation of the aircraft 122 within a specified distance or time from an emergency landing location. The specific operational restrictions of the performance standards may depend upon fault conditions present in the aircraft 122. For example, a particular performance standard may restrict operation of an aircraft with one fault to within 120 minutes of a landing site. However, the particular performance standard may restrict operation of the aircraft to within 90 minutes of a landing site when a second fault is also present in the aircraft. The filter instructions 112 may determine that the 90 minute restriction is more limiting than the 120 minute restriction, so only the 90 minute restriction may be presented to the user.

In a particular embodiment, the dispatch information computing system 102 receives and processes other information 118 besides the operational restrictions information 116 and fault information. For example, the other information 118 may include Notices to Airmen (NOTAMS), load sheets, flight plans, or other information that is related to the aircraft 122, a flight associated with the aircraft 122, or general information pertinent to many aircraft (e.g., general advisory information). The other information 118 may be analyzed with the operational restrictions information 116 and the fault information to determine output data 170. For example, the other information 118 may be taken into account to generate one or more of the customized task lists 142, 164, to determine the bottom line operational limitations, or for other purposes.

The dispatch information computing system 102 may include an output interface 110 coupled to the processor 104 to send the output data 170 to an output device, such as a display device 190, the aircraft-based computing system 130, or a ground-based computing system 150. The output data 170 may identify the bottom line operational limitations applicable to the aircraft 122. The output data 170 may also include the customized task lists 142, 164, other information, or any combination thereof. In a particular embodiment, the output data 170 may be separated into portions that pertain to various operational groups. The portions may be communicated to various output systems. Additionally, the various portions may be formatted by the dispatch information computing system 102 in a manner that is compatible with each output system that the output data 170 is sent to. For example, a first portion of the output data 170 may be converted to a first format that is compatible with the aircraft-based computer system 130 and a second portion of the output data 170 may be converted to a second format that is compatible with one of the ground based computer systems 150. The first format may be compatible with a document browser system 136 onboard the aircraft 122 that enables flight crew to view checklists and other information. In a particular illustrative embodiment, at least a portion of the output data 170 may be sent in a format that is compatible with a performance calculation system 134 aboard the aircraft 122. The performance calculation system 134 may use the portion of the output data 170 to determine performance information related to the aircraft 122 (such as fueling requirements, take-off or landing parameters, etc.). In another particular illustrative embodiment, at least a portion of the output data 170 may be sent in a format that is compatible with a flight planning system 138 aboard the aircraft 122. The flight planning system 138 may use the portion of the output data 170 to plan a flight of the aircraft 122 or to identify and flag portions of the planned route that would violate the operating limitations of the aircraft in its current condition.

In still another illustrative embodiment, at least a portion of the output data 170 may be sent to one of the ground-based computing systems 150. To illustrate, the output interface 110 may send a first task list of the customized task lists 164 to a first interface associated with a first operational group and may send a second task list to a second interface associated with a second operational group. For example, the ground-based computing systems 150 may include a maintenance computing system 152 that uses the output data 170 to generate or display a maintenance checklist that includes tasks determined by the dispatch information computing system 102 that are assigned to maintenance personnel. In another example, the ground-based computing systems 150 may include a dispatch computing system 154 that uses the output data 170 to generate or display a dispatch checklist that includes tasks determined by the dispatch information computing system 102 that are assigned to aircraft dispatch personnel. In another example, the ground-based computing systems 150 may include a passenger services computing system 156 that uses the output data 170 to generate or display a passenger services checklist that includes tasks determined by the dispatch information computing system 102 that are assigned to passenger services personnel. In still another example, the ground-based computing systems 150 may include a load planning computing system 158 that uses the output data 170 to generate or display a load checklist that includes tasks determined by the dispatch information computing system 102 that are assigned to loading or load planning personnel. In a further example, the ground-based computing systems 150 may include a flight planning computing system 160 that uses the output data 170 to generate or display a flight plan checklist that includes tasks determined by the dispatch information computing system 102 for assignment to flight planning personnel. In another example, the ground-based computing systems 150 may include a ramp computing system 162 that uses the output data 170 to generate or display a ramp checklist that includes tasks determined by the dispatch information computing system 102 that are assigned to ramp personnel. In various embodiments, the ground-based computing systems 150 may include additional or fewer computing systems to communicate the output data 170 to operational groups to which tasks are assigned. In a particular embodiment, each task list of the one or more customized task lists 164 excludes tasks assigned to other operational groups. Alternatively, two lists may be sent to each group, the first being a list of items to be accomplished by that group and the second to be a list of items to be verified by that group, to ensure that these items have been successfully accomplished by another group.

In an illustrative embodiment, the ground-based computing systems 150, the aircraft-based computing system 130, or both may include various types of computing systems. For example, the computing systems 130, 150 may include stationary computing system (e.g., desktop or rack mounted computing systems with substantially stationary displays), portable computing systems (e.g., laptop or notebook computing systems or computing tablets) or mobile computing systems (e.g., personal digital assistants, or wireless personal devices). The computing systems 130, 150 may include output devices, such as display devices or speakers, that enable a user to access the one or more customized task lists 142, 164. The computing systems 130, 150 may also include input devices, such as keyboards, pointing devices, touch-screens, etc., that enable a user to input information indicating a status of a task list item. For example, the user may provide input to indicate that a task list item has been completed or has been checked (i.e., verified). In another example, the user may provide input indicating that another checklist item should be added. To illustrate, load planning personnel may indicate that a particular task should be added to a flight crew checklist based on a particular cargo item added to the aircraft (such as a pet loaded in a cargo area).

Figure 2:
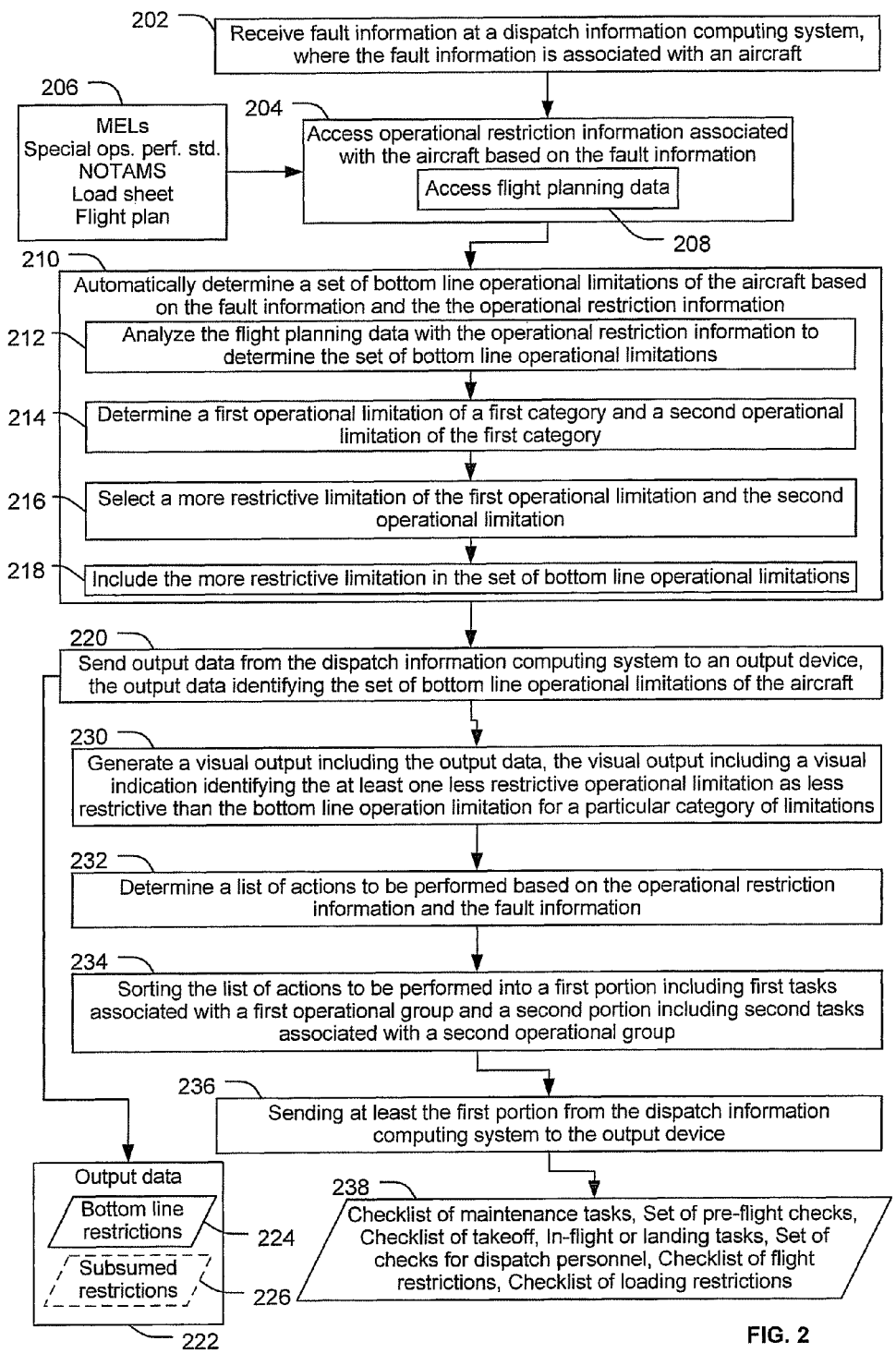
FIG. 2 is a flow chart of a particular embodiment of a method to manage aircraft dispatch information.

FIG. 2 is a flow chart of a particular embodiment of a method to manage aircraft dispatch information. The method includes, at 202, receiving fault information at a dispatch information computing system. The fault information is associated with an aircraft. For example, the fault information may identify one or more reported faults associated with the aircraft. To illustrate, the reported faults may include a condition reported by a fault monitoring system onboard the aircraft. In another illustrative example, the reported fault may include a condition reported by a flight crew or maintenance crew of the aircraft.

In a particular embodiment, the method includes, at 204, accessing operational restriction information 206 associated with the aircraft based on the fault information. The operational restriction information 206 may include information that identifies particular operational limits that are to be applied to the aircraft based on the fault information. For example, the operational restriction information 206 may include one or more minimum equipment lists (MELs), special operational performance standards, flight planning data, a load sheet, other operational restriction information (e.g., restrictions associated with Notices to Airmen (NOTAMS)), or any combination thereof. Special operational performance standards refer to standards that restrict particular types of operation of certain aircraft, such as operation of twin-engine aircraft over water. Examples of special operational performance standards include the extended-range twin-engine operational performance standards (ETOPS) and the long range operational performance standards (LROPS), etc.). To illustrate, the method may include, at 208, accessing flight planning data associated with a flight of the aircraft. The flight planning data may include load sheets, NOTAMS related to the flight, or other information.

In a particular embodiment, the method includes, at 210, automatically determining a set of bottom line operational limitations 224 of the aircraft based on the fault information and the operational restriction information 206. The bottom line operational limitations 224 may specify particular limits such as conditions in which the aircraft may fly, actions to be performed by the flight crew or other operational personnel, conditions to be avoided (e.g., icing conditions, distances from landing locations), or any other operational restriction or limitation applicable to the aircraft.

In a particular embodiment, other information may be processed with the operational restriction information 206 to determine the set of bottom line operation limitations 224. For example, the method may include, at 212, analyzing flight planning data with the operational restriction information 206 to determine the set of bottom line operational limitations 224.

In a particular illustrative embodiment, the operational restriction information 206 include operational limitations related to a plurality of categories of limitations. In this embodiment, automatically determining the set of bottom line operational limitations 224 includes, at 214, determining a first operational limitation of a first category of limitations and a second operational limitation of the first category of limitations. For example, the first category of limitations may relate to a maximum divert distance, which may be expressed as a maximum amount of time that the aircraft may fly from a landing site. The first operational limitation may specify a first maximum divert distance, such as 180 minutes, and the second operational limitation may specify a second maximum divert distance, such as 60 minutes. The method may also include, at 216, selecting a more restrictive limitation of the first operational limitation and the second operational limitation. The more restrictive limitation is included in the set of bottom line operational limitations 224, at 218. Thus, in the example provided, the second maximum divert distance of 60 minutes may be included in the set of bottom line limitations 224. In an illustrative embodiment, the less restrictive limitation (e.g., the first maximum divert distance of 180 minutes) may be omitted from the set of bottom line operational limitations 224. For example, output data 222 may not identify one or more subsumed operational limitations 226 from the operational restriction checklists 206. The subsumed operational limitations 226 may include operational limitations that are in a same category of limitations as a particular bottom line operational limitation 224 but that are less restrictive than the particular bottom line operational limitation 224. To illustrate, in the example of the maximum divert distances, the 60 minute maximum divert distance is considered to subsume the 180 minute maximum divert distance because the 60 minute maximum divert distance is more restrictive than the 180 minute maximum divert distance. That is, at any time that the aircraft is within 60 minutes of a landing site, the aircraft is also within 180 minutes of a landing site. Thus, the 180 minute maximum divert distance limitation is subsumed by the 60 minute maximum divert distance limitation.

The method may also include, at 220, sending the output data 222 from the dispatch information computing system to an output device. The output data 222 may identify the set of bottom line operational limitations 224 of the aircraft. In a particular embodiment, the output data 222 may also include less restrictive limitations, such as the subsumed operational limitations 226. To illustrate, for a particular category of limitations, the output data 222 may identify at least one operational limitation that is less restrictive than a bottom line operational limitation 224. In this embodiment, the method further includes, at 230, generating a visual output including the output data 222. The visual output includes a visual indication identifying the at least one less restrictive operational limitation as less restrictive than the bottom line operation limitation 224 for the particular category of limitations. For example, the less restrictive operational limitation may be visually distinguished from the bottom line operational limitations 224 by a display color, a display location, a flag or other icon, a text format (e.g., size, font, underlining, etc.), or any other visual indication that enables a user to visually distinguish the bottom line operation limitations 224 from less restrictive operational limitations, or any combination thereof.

The method may also include, at 232, determining a list of actions to be performed 238 based on the operational restriction information 206 and the fault information. For example, the list of actions to be performed 238 may include corrective actions (e.g., maintenance activities), operational tasks (e.g., tasks to be performed by a flight crew to operate the aircraft), checks (e.g., testing or verification steps to be performed to gather additional information about the aircraft or a fault condition of the aircraft, or to confirm that other tasks have been performed), or any combination thereof. The method may also include, at 234, sorting or filtering the list of actions to be performed 238 into a first portion including first tasks associated with a first operational group and a second portion including second tasks associated with a second operational group.

The method may include, at 236, sending at least a portion of the checklists (e.g., the first portion associated with the first operational group) from the dispatch information computing system to the output device. The output device may include another computing system, a display device, a hard copy output device (e.g., a printer), or any other device that enables a user to access and view the portion of the list of actions to be performed 238. Another portion of the list of actions to be performed 238 (e.g., the second portion associated with the second operational group) may also be sent to the output device. Alternately, or additionally, other portions of the list of actions to be performed 238 may be sent to other output devices, such as an output device associated with the second operational group. To illustrate, a portion of the list of actions to be performed 238 that includes maintenance tasks may be sent to an output device associated with a maintenance group. Similarly, a portion of the list of actions to be performed 238 that includes in-flight tasks may be sent to an output device onboard the aircraft.

In a particular illustrative embodiment, information sent to the maintenance group includes maintenance actions and checks to be performed prior to dispatch of the aircraft. Information sent to a dispatch group may identify the maintenance actions to be performed before dispatch, as well as special operation limitations, weather and environmental limitations, altitude limitations, and so forth. Information sent to a load planning group may include weight and distribution limitations and special fuel requirements. Information sent to a ramp personnel group may include restrictions against loading cargo in certain cargo bays. Information sent to a passenger services group may include overall weight limitations or restrictions against carrying pets in cargo areas. Information sent to a flight crew may include any of the information sent to the other groups or personnel identified above, in addition to special operating procedures, such as using an auxiliary power unit on takeoff or landing.

To further illustrate, one of the operational groups may include maintenance personnel and a portion of the list of actions to be performed 238 associated with the maintenance personnel may include a checklist of maintenance tasks to be performed to the aircraft by the maintenance personnel. In another example, one of the operational groups may include flight crew personnel and the portion of the list of actions to be performed 238 associated with the flight crew personnel may include a set of pre-flight checks to be performed to the aircraft by the flight crew personnel, a checklist of takeoff, in-flight or landing tasks to be performed to the aircraft by the flight crew personnel, or any combination thereof. In another example, one or more of the groups may include aircraft dispatch personnel and a portion of the list of actions to be performed 238 associated with the aircraft dispatch personnel may include a set of checks to be performed to the aircraft by the dispatch personnel. In yet another example, one of the operational groups may include flight planning personnel and a portion of the list of actions to be performed 238 associated with the flight planning personnel may include a checklist of flight restrictions to be applied by the flight planning personnel in planning a flight of the aircraft. In another example, one of the operational groups may include loading or load planning personnel and a portion of the list of actions to be performed 238 associated with the loading or load planning personnel may include a checklist of loading restrictions to be applied by the load planning personnel in planning loading of the aircraft. In a further example, one of the operational groups may include passenger services personnel and a portion of the list of actions to be performed 238 associated with the passenger services personnel may include tasks to be performed by the passenger services personnel to prepare the aircraft for a flight.

One or more of the tasks of the list of actions to be performed 238 may be associated with a particular time period. For example, one or more of the tasks may be assigned to be performed before a subsequent flight of the aircraft. Additionally, a first set of tasks may be designated to be performed during a first time period and a second set of tasks may be designated to be performed in a second time period. To illustrate, the first time period may be before a subsequent flight of the aircraft and the second time period may be during or after the subsequent flight of the aircraft.

The various embodiments disclosed provide aircraft dispatch information computing systems and methods to manage aircraft dispatch information. In a particular embodiment, all active maintenance items for an airplane are examined (e.g., based on a tail number of the aircraft) to determine a set of bottom line operational limitations for the aircraft. The bottom line operational limitations may be determined based on individual operational restriction items and based on restrictions that arise from interactions between operational restriction items. Additionally, one or more customized lists of actions and checks to be performed by various operational groups may be generated. For example, the operational groups may include maintenance personnel, dispatchers, load planners, ramp crew, passenger services, flight crew, other operational groups, or any combination thereof. Actions or checks that are not relevant to the aircraft due to the particular set of applicable operational restriction information; the status of the aircraft (e.g., open maintenance items or identified faults); or other factors, may be de-emphasized or omitted in the customized lists of actions and checks to be performed.

Automating the process of determining the bottom line operation limitations may reduce the potential for users to overlook a restriction. Additionally, automatically receiving fault information (e.g., from an on-board engine indicating and crew alert system (EICAS), an electronic logbook, or an aircraft health management system) may reduce errors due to users entering fault information. Further, the dispatch information computing system may automatically produce one or more checklists of actions and checks customized to various users. For example, flight crew checklists may be automatically generated and presented to the flight crew via an onboard document browser or electronic checklist display on the aircraft. In a particular embodiment, the dispatch information computing system may send the bottom line operational limitations to an onboard performance calculation system, so that performance calculations take the bottom line operational limitations into account. The dispatch information computing system may also send relevant limitations to a flight planning computing system that takes maintenance-related operational limitations, such as no dispatch into icing conditions, into account.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving fault information associated with an aircraft at a dispatch information computing system;
   automatically determining, via a processor of the dispatch information computing system, a set of operational limitations of the aircraft based on the fault information, based on operational restriction information, and based on a flight plan associated with the aircraft, wherein the operational restriction information includes a plurality of operational limitations of the aircraft; and
   sending output data that identifies at least one operational limitation from the set of operational limitations from the dispatch information computing system to an output device.

2. The method of claim 1, wherein each of the plurality of operational limitations is associated with one of a plurality of categories, the method further comprising:
   determining whether a first operational limitation of the set of operational limitations is more restrictive than a second operational limitation of the set of operational limitations, wherein the first operational limitation is associated with a first category of the plurality of categories and wherein the second operational limitation is associated with the first category; and
   in response to determining that the first operational limitation is more restrictive than the second operational limitation, including the first operational limitation in the output data.

3. The method of claim 2, the method further comprising in response to determining that the second operational limitation is more restrictive than the first operational limitation, including the second operational limitation in the output data.

4. The method of claim 1, wherein the operational restriction information includes one or more operations performance standards that restrict operations of the aircraft.

5. The method of claim 1, further comprising determining a list of actions to be performed based on the set of operational limitations included in the output data.

6. The method of claim 5, further comprising:
   sorting the list of actions to be performed into a first portion including first tasks associated with a first operational group and a second portion including second tasks associated with a second operational group; and
   sending at least the first portion from the dispatch information computing system to the output device.

7. The method of claim 6, wherein the first operational group includes maintenance personnel and the first portion includes a checklist of maintenance tasks associated with the aircraft that are to be performed by the maintenance personnel within a particular time period.

8. The method of claim 6, wherein the first operational group includes flight crew personnel and the first portion includes a set of pre-flight checks associated with the aircraft that are to be performed by the flight crew personnel.

9. The method of claim 6, wherein the first operational group includes flight crew personnel and the first portion includes a checklist of takeoff tasks, in-flight tasks, landing tasks, or any combination thereof, that are to be performed by the flight crew personnel.

10. The method of claim 6, wherein the first operational group includes flight planning personnel and the first portion includes a checklist of flight restrictions to be applied by the flight planning personnel.

11. The method of claim 6, wherein the first operational group includes load planning personnel and the first portion includes a checklist of loading restrictions to be applied by the load planning personnel.

12. The method of claim 6, wherein the first tasks are to be performed during a first time period and the second tasks are to be performed during a second time period.

13. The method of claim 12, wherein the first time period is before a flight of the aircraft.

14. A system, comprising:
a processor;
an input interface coupled to the processor and configured to receive fault information and flight plan information associated with an aircraft;
memory accessible to the processor, the memory including:
operational restriction information associated with the aircraft; and
instructions that are executable by the processor to generate one or more task lists, wherein each of the one or more task lists includes tasks assigned to a particular operational group based on the fault information, the flight plan information, and the operational restriction information; and
an output interface coupled to the processor and configured to send a first task list of the one or more task lists to a first interface associated with a first operational group and to send a second task list of the one or more task lists to a second interface associated with a second operational group.

15. The system of claim 14, wherein the memory further includes filter instructions to analyze the operational restriction information and the flight plan information based on the fault information to automatically determine one or more operational limitations applicable to the aircraft.

16. The system of claim 15, wherein the output interface is further configured to send output data to an output device, wherein the output data identifies the one or more operational limitations applicable to the aircraft.

17. The system of claim 16, wherein the output interface is further configured to send a first portion of the output data to an aircraft based computer system in a first format compatible with the aircraft based computer system and to send a second portion of the output data to a ground based computer system in a second format compatible with the ground based computer system.

18. A non-transitory computer readable storage medium, comprising instructions that, when executed by a processor, cause the processor to:
access operational restriction information associated with an aircraft in response to receiving fault information associated with the aircraft;
determine a set of operational limitations of the aircraft based on the fault information and the operational restriction information; and
send output data to an output device, wherein the output data identifies the set of operational limitations of the aircraft, wherein the output data indicates whether at least a portion of a flight plan associated with the aircraft violates the set of operational limitations.

19. The non-transitory computer readable storage medium of claim 18, further comprising instructions that, when executed by the processor, cause the processor to:
access flight planning data; and
analyze the flight planning data based on the operational restriction information to determine the set of operational limitations.

20. The non-transitory computer readable storage medium of claim 19, wherein the flight planning data includes one or more Notices to Airmen (NOTAMs) related to a planned flight of the aircraft.

* * * * *